US011825559B2

(12) United States Patent
Saiki et al.

(10) Patent No.: US 11,825,559 B2
(45) Date of Patent: Nov. 21, 2023

(54) COMMUNICATION SYSTEM, INFORMATION PROCESSING METHOD, AND CONTROL METHOD FOR MOVING OBJECT

(71) Applicant: HONDA MOTOR CO., LTD., Tokyo (JP)

(72) Inventors: Ryo Saiki, Tokyo (JP); Momoka Nakayama, Tokyo (JP); Takahiro Yoshimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 17/378,935

(22) Filed: Jul. 19, 2021

(65) Prior Publication Data

US 2022/0039202 A1 Feb. 3, 2022

(30) Foreign Application Priority Data

Jul. 29, 2020 (JP) .................... 2020-128440

(51) Int. Cl.
*H04W 84/18* (2009.01)
*H04W 4/02* (2018.01)
(Continued)

(52) U.S. Cl.
CPC ........... *H04W 84/18* (2013.01); *H04W 4/023* (2013.01); *H04W 4/46* (2018.02); *H04W 84/005* (2013.01); *H04W 88/08* (2013.01)

(58) Field of Classification Search
CPC ... H04W 84/005; H04W 84/18; H04W 84/22; H04W 4/02; H04W 4/023; H04W 4/44; H04W 4/46; H04W 88/08
See application file for complete search history.

(56) References Cited

U.S. PATENT DOCUMENTS 7,123,926 B2 * 10/2006 Himmelstein ......... G06Q 10/10
455/518
8,160,078 B2 * 4/2012 Chen ................... H04W 40/28
370/351
(Continued)

FOREIGN PATENT DOCUMENTS

CN 110910156 A 3/2020
JP 2007510197 A 4/2007
(Continued)

OTHER PUBLICATIONS

Chinese Office Action for Chinese Patent Application No. 202110792790.1 dated May 5, 2023.
(Continued)

*Primary Examiner* — Jenee Holland
(74) *Attorney, Agent, or Firm* — Thomas | Horstemeyer, LLP

(57) ABSTRACT

A communication system conducts wireless communication with a communication apparatus present in a vicinity of a moving object, and conducts inter-vehicle wireless communication with a communication device mounted on another moving object. The communication system specifies a group formed with a plurality of moving objects capable of conducting the inter-vehicle wireless communication, and distributes a content to the communication apparatus. The communication system differentiates the content to be distributed to the communication apparatus depending on a formation of the group that has been specified.

10 Claims, 10 Drawing Sheets

(51) Int. Cl.
*H04W 4/46* (2018.01)
*H04W 84/00* (2009.01)
*H04W 88/08* (2009.01)
*H04L 67/30* (2022.01)
*H04W 4/23* (2018.01)
*H04W 4/40* (2018.01)
*H04W 76/40* (2018.01)
*H04W 4/08* (2009.01)
*H04W 8/18* (2009.01)

(56) References Cited

U.S. PATENT DOCUMENTS

| | | | |
|---|---|---|---|
| 8,438,154 B2 | 5/2013 | Harik | |
| 8,644,225 B2* | 2/2014 | Chen | H04W 40/246 709/227 |
| 8,717,192 B2* | 5/2014 | Durekovic | G08G 1/22 340/903 |
| 9,955,306 B1* | 4/2018 | Barron | H04W 4/023 |
| 10,055,987 B2* | 8/2018 | Stählin | G08G 1/096791 |
| 10,158,977 B2* | 12/2018 | Cordova | H04L 67/535 |
| 10,305,576 B2 | 5/2019 | High et al. | |
| 10,803,679 B2* | 10/2020 | Abuelsaad | H04W 4/44 |
| 11,416,940 B1* | 8/2022 | Davidson | B60W 60/0025 |
| 2002/0032035 A1* | 3/2002 | Teshima | H04W 4/21 455/566 |
| 2005/0065806 A1 | 3/2005 | Harik | |
| 2006/0176847 A1* | 8/2006 | Chen | H04L 61/00 370/328 |
| 2007/0030823 A1* | 2/2007 | Guo | H04W 40/24 370/328 |
| 2007/0115868 A1* | 5/2007 | Chen | H04W 8/186 370/254 |
| 2008/0095134 A1* | 4/2008 | Chen | H04W 40/32 370/342 |
| 2011/0231129 A1* | 9/2011 | Yanai | H01L 22/20 702/81 |
| 2014/0037138 A1* | 2/2014 | Sato | G06V 20/58 382/103 |
| 2014/0049646 A1* | 2/2014 | Nix | G06V 20/588 348/148 |
| 2014/0214543 A1* | 7/2014 | Gandhi | G06Q 30/0267 705/14.58 |
| 2014/0302774 A1* | 10/2014 | Burke | G07C 5/08 455/3.05 |
| 2015/0317687 A1* | 11/2015 | Ramesh | G06Q 30/0269 705/14.66 |
| 2016/0209220 A1* | 7/2016 | Laetz | G06Q 10/047 |
| 2017/0118670 A1* | 4/2017 | Seo | H04L 1/00 |
| 2017/0206238 A1* | 7/2017 | Coutinho | G06F 16/215 |
| 2017/0302362 A1 | 10/2017 | High et al. | |
| 2018/0025634 A1* | 1/2018 | Ujiie | G08G 1/0962 701/119 |
| 2018/0047284 A1* | 2/2018 | Narasimha | G08G 1/094 |
| 2018/0056998 A1* | 3/2018 | Benosman | B60W 30/09 |
| 2018/0144369 A1* | 5/2018 | Pouliot | G08G 1/161 |
| 2018/0148050 A1* | 5/2018 | Katou | H04W 4/46 |
| 2018/0240339 A1* | 8/2018 | Moisio | H04W 12/10 |
| 2018/0246907 A1* | 8/2018 | Thiel | G06V 20/58 |
| 2018/0270727 A1* | 9/2018 | Kim | H04W 4/44 |
| 2018/0326980 A1* | 11/2018 | He | B60W 30/09 |
| 2018/0356838 A1* | 12/2018 | Schmidt | G05D 1/0297 |
| 2019/0005818 A1* | 1/2019 | Altinger | G08G 1/096791 |
| 2019/0012606 A1* | 1/2019 | Nixon | H04W 4/021 |
| 2019/0045005 A1* | 2/2019 | Verrall | H04L 67/04 |
| 2019/0050904 A1* | 2/2019 | Wasserman | G08G 1/0116 |
| 2019/0075425 A1* | 3/2019 | Lynch | H04W 4/021 |
| 2019/0075426 A1* | 3/2019 | Nomura | H04W 4/023 |
| 2019/0087674 A1* | 3/2019 | Gao | G06T 5/00 |
| 2019/0238214 A1 | 8/2019 | High et al. | |
| 2019/0239118 A1* | 8/2019 | Baghel | H04L 5/0053 |
| 2019/0266644 A1* | 8/2019 | Cho | G09F 27/005 |
| 2019/0268083 A1* | 8/2019 | Cho | H04W 4/23 |
| 2019/0268743 A1* | 8/2019 | Cho | G06Q 30/0265 |
| 2019/0302771 A1* | 10/2019 | Borkowski | G01S 13/931 |
| 2019/0311404 A1* | 10/2019 | Wasserman | G06Q 30/0265 |
| 2019/0347695 A1 | 11/2019 | Jorge | |
| 2020/0008018 A1* | 1/2020 | Moustafa | G08G 1/096791 |
| 2020/0090225 A1 | 3/2020 | Hayashi et al. | |
| 2020/0098007 A1* | 3/2020 | Sakurada | G06Q 30/0265 |
| 2020/0098008 A1* | 3/2020 | Takemura | H04W 4/40 |
| 2020/0218276 A1* | 7/2020 | Lee | G05D 1/0257 |
| 2021/0287459 A1* | 9/2021 | Cella | G07C 5/0808 |
| 2022/0038992 A1* | 2/2022 | Otaka | H04W 24/02 |
| 2022/0039202 A1* | 2/2022 | Saiki | H04L 67/30 |
| 2022/0242405 A1* | 8/2022 | Shimbo | B60W 10/18 |

FOREIGN PATENT DOCUMENTS

| | | |
|---|---|---|
| JP | 2019-521536 A | 7/2019 |
| WO | 2014/002223 A1 | 1/2014 |

OTHER PUBLICATIONS

Japanese Office Action for Japanese Patent Application No. 2020-128440 mailed Aug. 14, 2023 (partially translated).

* cited by examiner

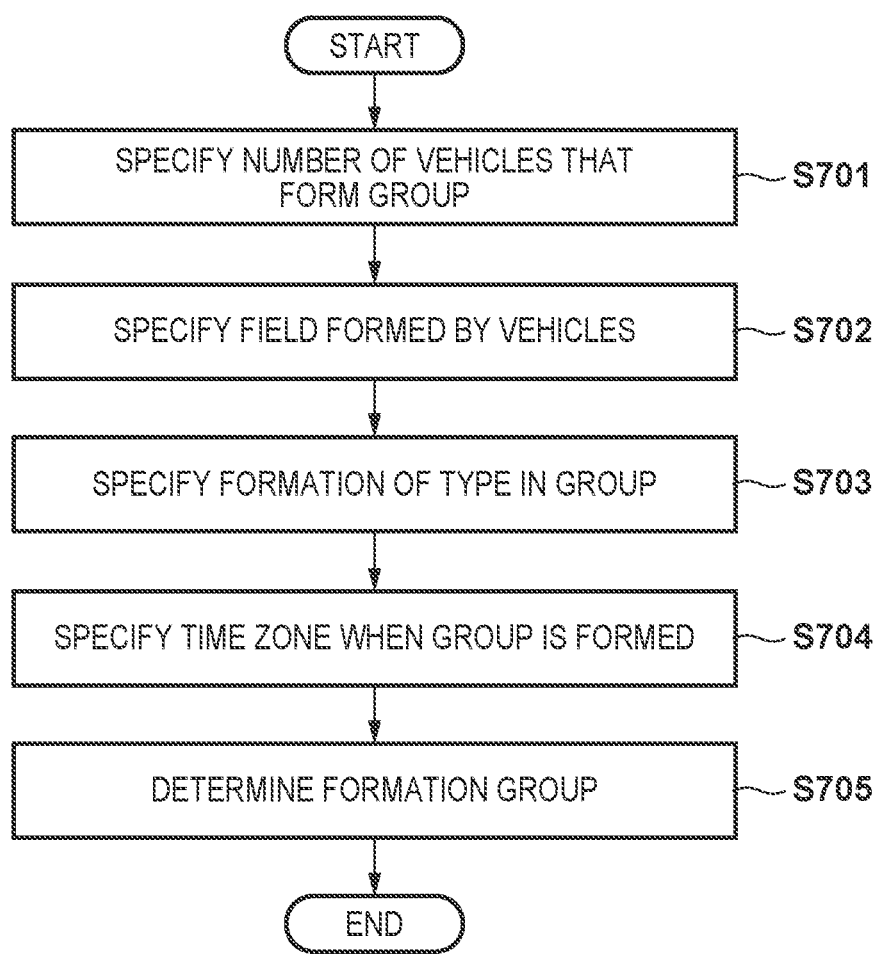

FIG. 9

| RARITY LEVEL OF GROUP (1 TO 10) | CONDITIONS SUCH AS NUMBER / FIELD SHAPE / TYPE | | | |
|---|---|---|---|---|
| | NUMBER | FIELD SHAPE | TYPE | TIME ZONE |
| 1 | TWO VEHICLES | × (NO DESIGNATION) | × (NO DESIGNATION) | A.M. 10:00 to 12:00 |
| 2 | THREE VEHICLES | TRIANGLE | × (NO DESIGNATION) | × (NO DESIGNATION) |
| 3 | THREE VEHICLES | TRIANGLE | FAMILY CAR (A TYPE OR THE LIKE) | × (NO DESIGNATION) |
| ... | ... | ... | ... | ... |
| 10 | FOUR VEHICLE | TRIANGLE INSIDE SQUARE | COMBINATION OF B TYPE AND C TYPE | × (NO DESIGNATION) |
| 10 | SEVEN VEHICLES | | × (NO DESIGNATION) | × (NO DESIGNATION) |
| 10 | THREE VEHICLES | STRAIGHT LINE | C TYPE (LUXURY CAR) ONLY | × (NO DESIGNATION) |

COMMUNICATION SYSTEM, INFORMATION PROCESSING METHOD, AND CONTROL METHOD FOR MOVING OBJECT

CROSS-REFERENCE TO RELATED APPLICATION(S)

This application claims priority to and the benefit of Japanese Patent Application No. 2020-128440 filed on Jul. 29, 2020, the entire disclosure of which is incorporated herein by reference.

BACKGROUND OF THE INVENTION

Field of the Invention

The present invention relates to a communication system configured to distribute a content, an information processing method, and a control method for the moving object.

Description of the Related Art

In these years, a technique for distributing advertisement information from a vehicle to a communication terminal that is present in the vicinity of the vehicle is known (Japanese Patent Laid-Open No. 2019-521536). Japanese Patent Laid-Open No. 2019-521536 discloses a technique in which a carriage such as a vehicle provides a user device with an access point of a network, and provides a content based on a profile of a user of the user device that is connected with the access point and a current location of the user device.

In the technique described in Japanese Patent Laid-Open No. 2019-521536, in a case of providing the content (for example, an advertisement) based on the profile and the current location of the user, it is possible to provide a target advertisement that matches a user's preference. On the other hand, in a case where a user's favorite tendency or an action range converges into a certain range, a fixed advertisement may be provided. For this reason, there is a concern that for the user of the communication terminal that accesses the access point, unexpectedness in the content is scarce and the provided content hardly remains in the user's memory.

SUMMARY OF THE INVENTION

The present disclosure has been made in consideration of the aforementioned issues, and realizes a technique capable of providing a communication apparatus that uses an access point with a content of unexpectedness.

In order to solve the aforementioned problems, one aspect of the present disclosure provides a communication system comprising: one or more processors; and a memory storing instructions which, when the instructions are executed by the one or more processors, cause the one or more processors to: conduct wireless communication with a communication apparatus present in a vicinity of a moving object; conduct inter-vehicle wireless communication with a communication device mounted on another moving object; specify a group formed with a plurality of moving objects capable of conducting the inter-vehicle wireless communication; and distribute a content to the communication apparatus, wherein the distributing of the content includes differentiating the content to be distributed to the communication apparatus depending on a formation of the group that has been specified.

Another aspect of the present disclosure provides, an information processing method performed in an information processing apparatus configured to distribute a content, a moving object including communication circuits capable of conducting wireless communication with a communication apparatus present in a vicinity and inter-vehicle wireless communication with a communication device mounted on another moving object, the information processing method comprising: acquiring, from at least the moving object, information regarding a communication situation of a plurality of moving objects that conduct the inter-vehicle wireless communication; and specifying a group formed with the plurality of moving objects that conduct the inter-vehicle wireless communication; and distributing of the content to the moving object so that the moving object distributes the content to the communication apparatus, or distributing of the content to the communication apparatus, wherein the distributing of the content includes differentiating the content to be distributed depending on a formation of the group that has been specified.

Still another aspect of the present disclosure provides, a control method for a moving object performed in the moving object, the moving object including communication circuits capable of conducting wireless communication with a communication apparatus present in a vicinity of the moving object and inter-vehicle wireless communication with a communication device mounted on another moving object, the control method comprising: specifying a group formed with a plurality of moving objects that conduct the inter-vehicle wireless communication; and distributing a content to the communication apparatus, wherein the distributing of the content includes differentiating the content to be distributed to the communication apparatus depending on a formation of the group that has been specified.

According to the present invention, the provision of a content of unexpectedness to the communication apparatus that uses the access point is enabled.

BRIEF DESCRIPTION OF THE DRAWINGS

FIG. 7 is a flowchart illustrating a series of operations of a group specifying process in the content control process according to the first embodiment;

FIG. 9 is a diagram illustrating an example of group formation information according to the first embodiment.

DESCRIPTION OF THE EMBODIMENTS

Figure 1:
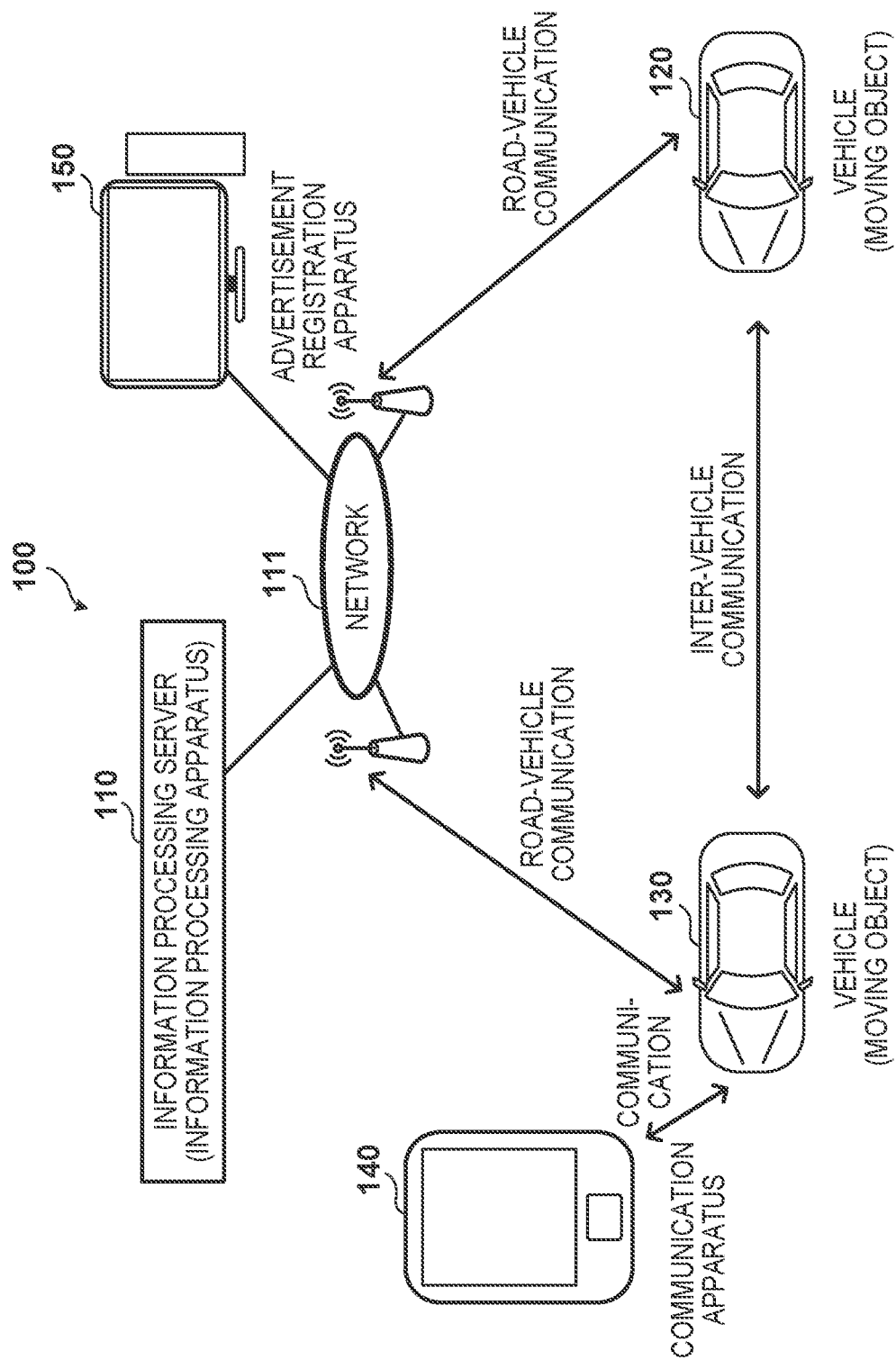
FIG. 1 is a diagram illustrating an example of a vehicular communication system according to a first embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

In a first embodiment, a description will be given with regard to an example in which an information processing server performs a content control process in accordance with a communication group including a plurality of vehicles. Note that in the following description, a case where a content handled in the content control process is an advertisement content will be given as an example. However, the content is not limited to the content related to advertisement, and may include a content related to a game. In a case where the content is a game content, for example, the game content may be a game character (for example, a monster, a fellow member, or the like) that can appear in a game, an item (for example, a tool, a skill, or the like) that can be used in the game, or a game itself conducted and displayed on a communication apparatus 140.

<Configuration of Vehicular Communication System>

A configuration of a vehicular communication system 100 according to the present embodiment will be described with reference to FIG. 1. A vehicle 120 and a vehicle 130 (in a case where they are not particularly distinguished from each other, they are simply referred to as the vehicle 130) are, for example, electric automobiles or vehicles capable of traveling using fuel. The vehicle 130 is capable of measuring a state in the vehicle with various sensors disposed in the vehicle, and transmitting collected data to an information processing server 110. The data collected and transmitted in this manner is also generally referred to as floating data, probe data, traffic information, or the like. Such data includes, for example, a current location, a speed of the vehicle, a remaining amount of a battery or the fuel of the vehicle, an image or three-dimensional data that has been obtained by a camera or LIDAR, and the like, but may include other information. These pieces of data are transmitted to the information processing server 110 at regular intervals or in response to an occurrence of a specific event. Further, the vehicle 130 may also transmit to the information processing server 110, setting information such as a destination and a passing place set by a user, and information regarding a communication situation of the vehicle 130. In the following description, data transmitted from the vehicle 130 to the information processing server 110 is collectively referred to as vehicle information. The vehicle information is transmitted to the information processing server 110 via a mobile telephone network to be described later, in some cases. However, the vehicle information may be transmitted (off-road transmission) on road-vehicle communication for connection with an access point of Wi-Fi (registered trademark) communication near a route in order to control a communication band of the mobile telephone network. Alternatively, the vehicle information of the vehicle 120 may be once transmitted to the vehicle 130 on inter-vehicle communication, and then transmitted to the information processing server 110 by the vehicle 130 on the road-vehicle communication. The inter-vehicle communication and the road-vehicle communication are not limited to the Wi-Fi communication, and may use cellular V2X (C-V2X) communication and DSRC.

The vehicle 130 is, for example, a four-wheel vehicle as an example of a moving object. The vehicle 130 functions as an access point (simply, referred to as an AP in some cases) to provide communication apparatuses in the vicinity with network accesses (for example, for the wireless communication of Wi-Fi). The communication method is not limited to the Wi-Fi communication, and may be ultra wide band (UWB) wireless communication or the like.

In the following embodiment, a case where the vehicle 130 is a four-wheel vehicle will be described as an example. However, the vehicle 130 may be another moving object. For example, the moving object may include a configuration capable of moving by itself, such as a two-wheel vehicle or a drone.

The information processing server 110 includes one or more server apparatuses, and as will be described later, is capable of performing a content control process and providing the communication apparatus 140 with a content in accordance with a group formation of vehicles (including the vehicle 130 that provides the access point). In a case where the content is an advertisement content, the content may be, for example, not only an advertisement of an image or a moving image displayed on a display screen of the communication apparatus 140 but also a coupon or a point with which a discount is available at the time of purchasing a product. In addition, the information processing server 110 sequentially acquires vehicle information from the plurality of vehicles 130 via a network 111. Using the acquired information, the information processing server 110 is capable of estimating, for example, a route along which the vehicle passes, a time necessary for passing, and the like, and is capable of grasping the type of each vehicle based on the vehicle information.

The network 111 includes, for example, a communication network such as the Internet or a mobile telephone network, and transmits information between the information processing server 110 and the vehicle 130 and between the information processing server 110 and an advertisement registration apparatus 150.

The communication apparatus 140 is, for example, a smartphone capable of switching between wireless communication via a mobile telephone communication network and wireless communication provided by the vehicle 130 or the like, so as to use the wireless communication. However, the communication apparatus 140 is not limited to the smartphone, and may be a personal computer, a tablet terminal, a head-mounted display, an augmented reality (AR) terminal, or the like.

The communication apparatus 140 is capable of accessing the network, for example, via wireless communication, such as the Wi-Fi (by connecting with an access point provided by the vehicle 130) or via the network 111, such as a mobile telephone communication network. Further, the communication apparatus 140 is capable of receiving an advertisement content from the information processing server 110 via the vehicle 130 or the mobile telephone communication network.

The advertisement registration apparatus 150 is, for example, a personal computer for registering advertisement contents of companies, shops, administrative agencies, and the like in its region. The advertisement registration apparatus 150 may be installed in an advertisement agency that handles advertisements, or may be installed in each of the companies, shops, and the like in its region. Further, in addition to the registration of the advertisement contents, the advertisement registration apparatus 150 is capable of setting an advertisement condition representing on what condition the advertisement content is displayed.

<Configuration of Information Processing Server>

Next, a functional configuration example of the information processing server 110 that performs the content control process, as an example of the information processing apparatus, will be described with reference to FIG. 2. Note that the respective functional blocks to be described may be integrated together or separated from each other, and a function to be described may be implemented by another block. In addition, a functional block to be described as hardware may be realized by software, and vice versa.

A communication unit 201 includes a communication circuit that communicates with various apparatuses via the network 111. Information that has been processed by a controller 202 is transmitted to a device of a communication partner (for example, the vehicle 130 and the like), and information to be processed by the controller 202 is received from the device of the communication partner (for example, the vehicle 130 and the like).

The controller 202 includes a central processing unit (CPU) 210, which is a processor, and a random access memory (RAM) 211. The controller 202 develops and performs, in the RAM 211, a program stored in a storage unit 203, so as to control the operation of each unit inside the controller 202 and control the operation of each unit of the information processing server 110. Further, the controller 202 performs the content control process to be described later.

The RAM 211 includes, for example, a volatile storage medium such as a dynamic RAM (DRAM), and temporarily stores parameters, process results, and the like for the controller 202 to perform a program.

The storage unit 203 includes, for example, a non-volatile storage medium such as a semiconductor memory, and stores setting values and programs necessary for the operation of the information processing server 110. The storage unit 203 includes an advertisement DB 221, a user DB 222, and a vehicle information DB 223. The advertisement DB 221 stores the advertisement content and the advertisement condition registered by the advertisement registration apparatus 150. The user DB 222 stores user information acquired from the communication apparatus 140 and location information of the communication apparatus 140. The vehicle information DB 223 stores vehicle information acquired from each vehicle 130.

An information acquisition unit 212 acquires vehicle information from a vehicle passing on a road, and stores the vehicle information in the vehicle information DB 223 of the storage unit 203, for example. In addition, the information acquisition unit 212 acquires an advertisement content and an advertisement condition registered by the advertisement registration apparatus 150 from the advertisement registration apparatus 150, and stores the advertisement content and advertisement condition that have been acquired, in the storage unit 203. Further, the information acquisition unit 212 acquires user information indicating user attributes such as gender and age of the user and the location information of the communication apparatus 140 from the communication apparatus 140, and stores the information that has been acquired, in the storage unit 203.

A vehicle group determination unit 213 determines a group including vehicles, based on the vehicle information that has been acquired from one or more vehicles 130, which are present in a specific region.

A content determination unit 214 determines an advertisement content to be provided for the communication apparatus 140 connected with the vehicle 130 in accordance with the vehicle group that has been determined. The advertisement content is determined to be different depending on what type of vehicle group is formed in a vicinity of the communication apparatus 140. For example, in a case where a vehicle group with a high rarity (rare) is formed, the content is determined to transmit an advertisement product or a coupon corresponding to the rarity. With such a configuration, the user of the communication apparatus 140 is capable of receiving an advertisement content that is not uniform and that has unexpectedness in accordance with the situation occurring in the vicinity.

A distribution destination user determination unit 215 determines the communication apparatus 140, to which the advertisement content is distributed. For example, the information processing server 110 transmits the advertisement content that has been determined, in accordance with the user information (a user attribute) of the communication apparatus 140, a moving state (a moving state of the user) of the communication apparatus 140, and the like, from among the users who are present in a specific region.

A content distribution unit 216 distributes the advertisement content that has been determined to the communication apparatus 140, which is a distribution destination, via the network 111.

<Configuration of Communication Apparatus>

Figure 3:
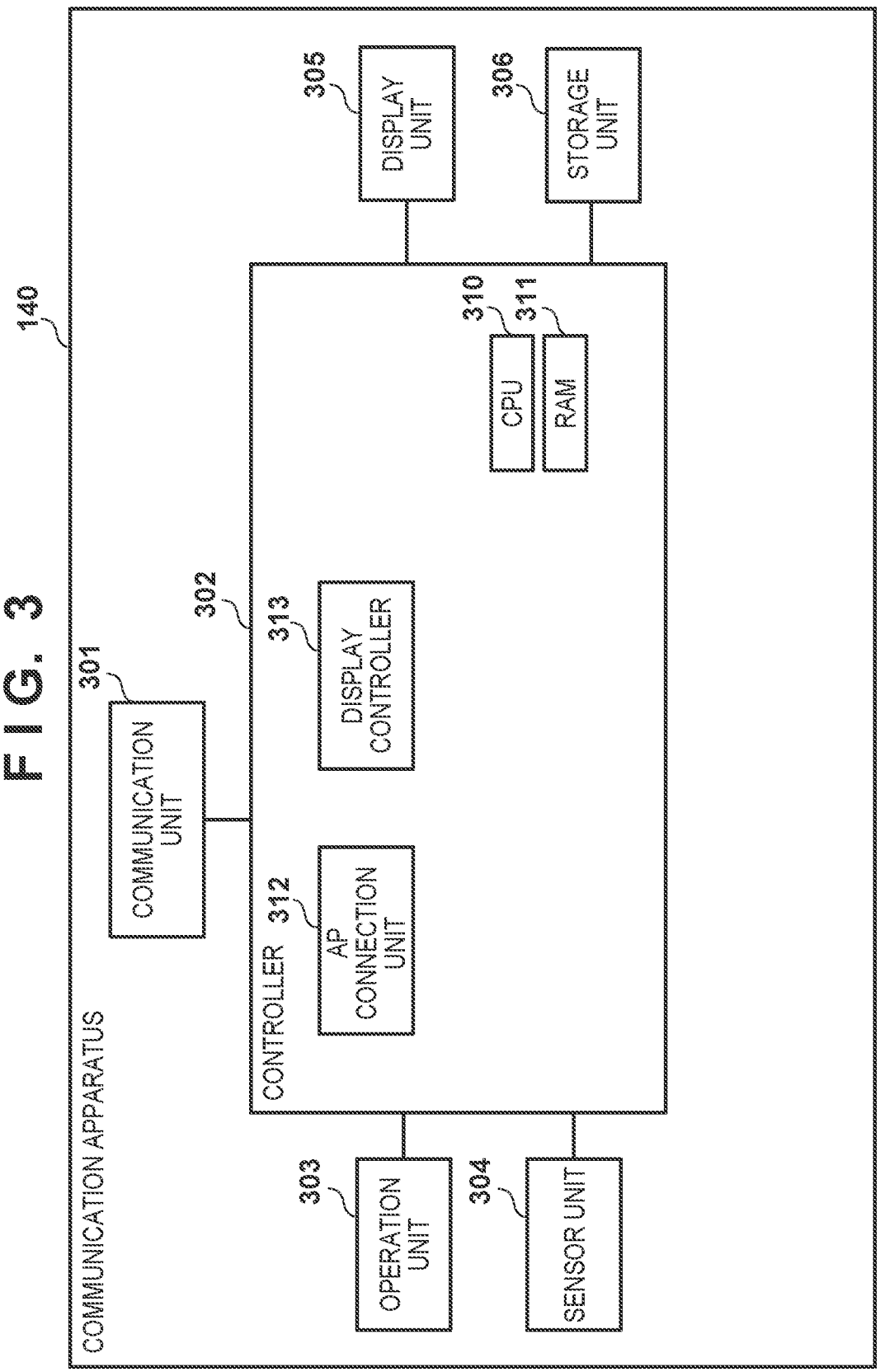
FIG. 3 is a block diagram illustrating a functional configuration example of a communication apparatus according to the first embodiment.

Next, a configuration example of the communication apparatus 140 will be described with reference to FIG. 3. The configuration illustrated in FIG. 3 illustrates a functional configuration example of a smartphone as an example of the communication apparatus 140 in the present embodiment. Note that the respective functional blocks to be described may be integrated together or separated from each other, and a function to be described may be implemented by another block. In addition, a functional block to be described as hardware may be realized by software, and vice versa.

A communication unit 301 includes, for example, communication circuits or the like, and transmits and receives necessary data by connecting with the Internet via mobile communication such as long term evolution (LTE) or connecting with the vehicle 130 via the Wi-Fi communication or the UWB communication, for example.

An operation unit 303 includes buttons and a touch panel provided on the communication apparatus 140, and accepts operations on a graphical user interface (GUI) for various operations, such as an access point selection screen displayed on a display unit 305 and a user information setting screen for setting user information (for example, gender, age, and the like). Note that the GUI for various operations may include a GUI of a browser application that displays information on the network, and the user information may include an access history of the browser application.

The display unit 305 includes, for example, a display panel such as a liquid crystal display (LCD) or an organic light-emitting diode (OLED), and displays a GUI for various operations in accordance with an instruction from a display controller 313. The display unit 305 displays the advertisement content that has been acquired from the information processing server 110 on the screen, in response to an instruction from the display controller 313. The display unit 305 may display an augmented reality image (also referred to as an AR image) for displaying an advertisement content on a captured image including a vicinity (for example, a specific vehicle) of the communication apparatus 140.

A sensor unit 304 includes a global positioning system (GPS) for specifying a current location, an imaging sensor for acquiring an image or a moving image in which a vicinity of the communication apparatus 140 has been captured, a sensor for biometric authentication for specifying the user of the communication apparatus 140, and the like.

A storage unit 306 includes, for example, a non-volatile memory such as a semiconductor memory, and stores user information that has been set, a program to be performed by a controller 302, and the like.

The controller 302 includes a CPU 310 and a RAM 311. The CPU 310 performs, for example, a program stored in the storage unit 306 to control an operation of each functional block in the controller 302 or each unit in the communication apparatus 140.

An AP connection unit 312 acquires information of an access point transmitted from the access point that is secured on a vehicle 130 in the vicinity or on a road, provides the information to the display controller 313, and controls a connection to the access point that has been selected on an access point screen.

The display controller 313 generates an operation screen and image information to be displayed on the display unit 305, and provides the display unit 305 with the operation screen and the image information.

<Configuration of Information Processing Apparatus in Vehicle>

Figure 4:
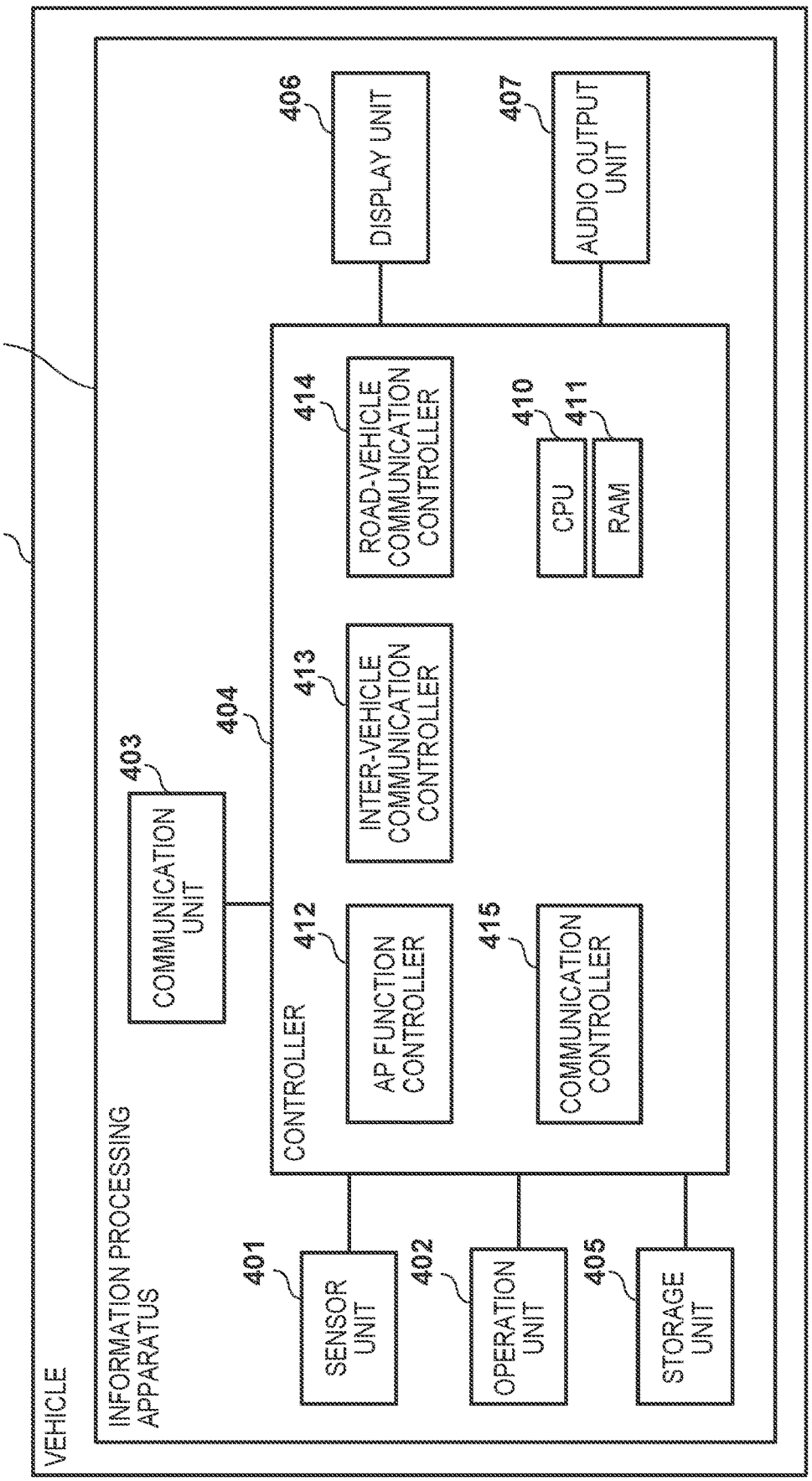
FIG. 4 is a block diagram illustrating a functional configuration example of an information processing apparatus in a vehicle according to the first embodiment.

Next, a functional configuration example of an information processing apparatus 400 in the vehicle 130 will be described with reference to FIG. 4. Note that the configuration illustrated in FIG. 4 is an example, and some functional blocks may be provided outside the information processing apparatus 400 (and in the vehicle 130). For example, one or more of a sensor unit 401, a communication unit 403, a storage unit 405, a display unit 406, and an audio output unit 407 may be provided outside the information processing apparatus 400. In addition, it is assumed that the vehicle 120 includes a similar information processing apparatus 400. In the following description, a case where the information processing apparatus 400 is an in-vehicle apparatus will be given as an example. However, the information processing apparatus 400 is not limited to the in-vehicle apparatus, and may be an electronic apparatus detachable from the vehicle 130.

The sensor unit 401 includes various sensors for acquiring information regarding behaviors of the vehicle, that is, information regarding the position of the vehicle, a vehicle speed, acceleration of the vehicle, the presence or absence of a brake operation, a charge amount of the battery, and the like. Examples of the sensor include a GPS, a speed sensor, an acceleration sensor, a sensor for measuring a charge amount, a sensor for detecting a brake operation, and the like. A part or all of the data that has been acquired from the sensor is stored in the storage unit 405, and is then transmitted to the information processing server 110 via the communication unit 403. Further, the sensor unit 401 includes a light detection and ranging (Lidar) or a camera for acquiring information about peripheries of a travel route (for example, three-dimensional information using a visible light or a laser light).

An operation unit 402 includes operation members such as a touch panel and buttons of the information processing apparatus 400, so as to enable operations on route guidance (navigation) and the GUI for various operations that are displayed on the display unit 406. The communication unit 403 is a communication device including, for example, communication circuits or the like, simultaneously uses or switches between, for example, the mobile communication such as LTE, the inter-vehicle communication with another vehicle, the Wi-Fi communication with an access point of a road or a shop, and the like, and transmits and receives necessary data to and from the information processing server 110.

A controller 404 includes a CPU 410 including one or more arithmetic units (processors), and a RAM 411. The CPU 410 performs, for example, a program stored in the storage unit 405 to control an operation of each functional block in the controller 404 or each unit in the information processing apparatus 400.

The storage unit 405 includes, for example, a non-volatile memory such as a semiconductor memory, and holds a database in which the vehicle information is temporarily stored, map information for the route guidance, and the like. In addition, the storage unit 405 holds a program performed by the controller 404.

The display unit 406 includes, for example, a display panel such as an LCD or an OLED, and displays a map to be displayed at the time of the route guidance, a user interface for operations, a user interface for performing various settings of the information processing apparatus and performing various operations in the vehicle 130, and the like. The audio output unit 407 includes, for example, a speaker capable of outputting audio information to the user.

An AP function controller 412 controls the communication unit 403 so that the vehicle 130 serves as an access point, and provides network access. The AP function controller 412 provides the communication apparatus 140, which is present in the vicinity of the vehicle 130 with, for example, network access in compliance with the Wi-Fi communication (for example, free Wi-Fi) or network access in compliance with UWB. Further, the AP function controller 412 conduct wireless communication with the communication apparatus 140, which is present in the vicinity of the vehicle 130, so as to be capable of transmitting an advertisement content to the communication apparatus 140 (when the advertisement content is provided from the information processing server 110).

An inter-vehicle communication controller 413 controls inter-vehicle communication with another vehicle 130, and controls, for example, communication in compliance with the Wi-Fi communication, the cellular V2X (C-V2X) communication, or DSRC.

A road-vehicle communication controller 414 performs the Wi-Fi communication, the cellular V2X (C-V2X) communication, or DSRC with an access point arranged on a road side or provided by a roadside shop, and offloads necessary communication. A communication controller 415 controls switching of communication by the vehicle with the outside and validity and invalidity of an access point.

<Configuration of Advertisement Registration Apparatus>

Figure 5:
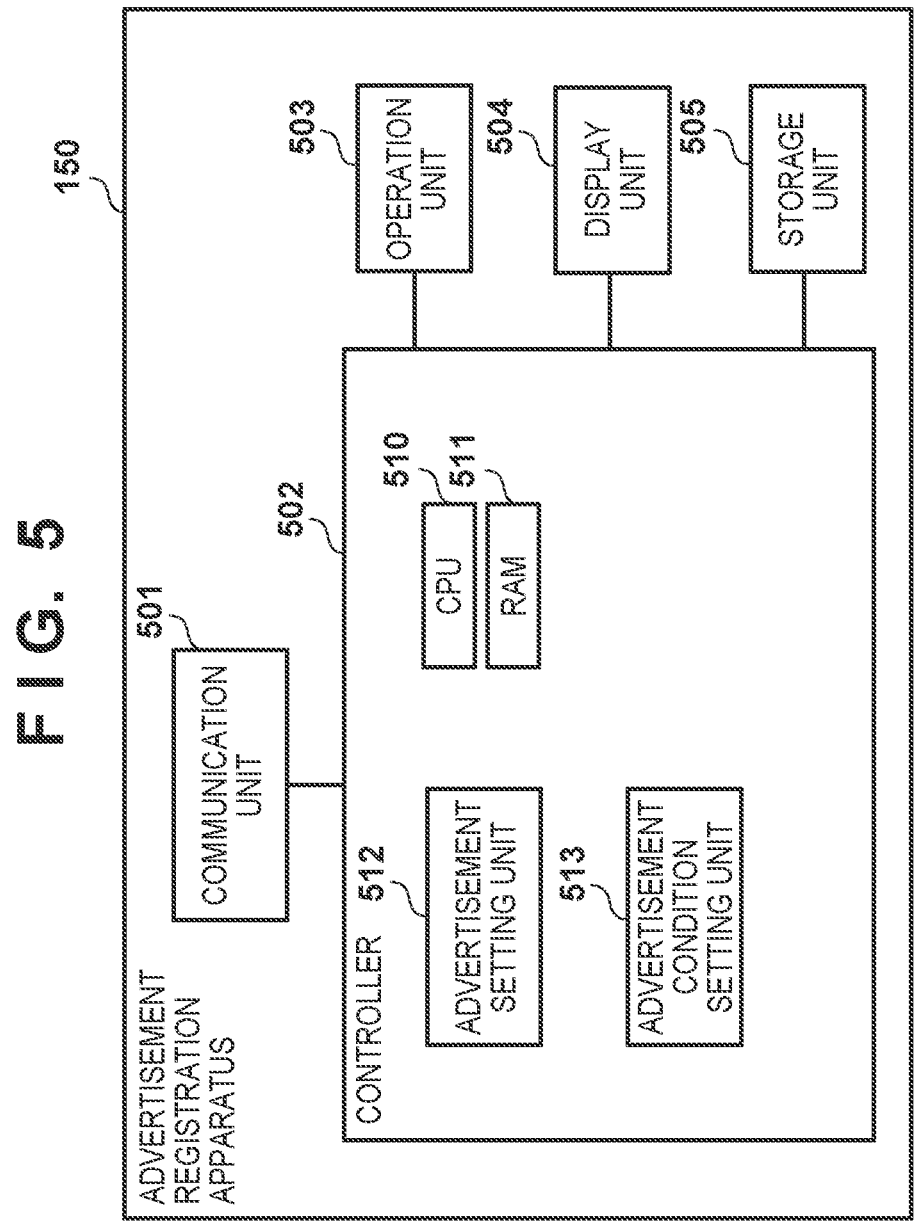
FIG. 5 is a block diagram illustrating a functional configuration example of an advertisement registration apparatus according to the first embodiment.

Furthermore, a configuration of the advertisement registration apparatus 150 according to the present embodiment will be described with reference to FIG. 5. As described above, the advertisement registration apparatus 150 is a personal computer that registers an advertisement to be distributed to the communication apparatus 140, which is present in a specific region, and that sets an advertisement condition. Note that the respective functional blocks to be described may be integrated together or separated from each other, and a function to be described may be implemented by another block. In addition, a functional block to be described as hardware may be realized by software, and vice versa.

A communication unit 501 includes, for example, communication circuits or the like, and is connected with the Internet via, for example, wired or wireless communication to transmit and receive necessary data to and from the information processing server 110.

An operation unit 503 includes, for example, a keyboard and a touch panel, and accepts an operation of setting the advertisement content and the advertisement condition for the specific region. A display unit 504 includes, for example, a display panel such as an LCD or an OLED, and displays a GUI for setting the advertisement content and the advertisement condition for the specific region, a GUI for various operations, and the like.

A storage unit 505 includes, for example, a non-volatile memory such as a semiconductor memory, and stores a program or the like performed by a controller 502.

The controller 502 includes a CPU 510 and a RAM 511. The CPU 510 performs, for example, a program stored in the storage unit 505 to control an operation of each functional block in the controller 502 or each unit in the advertisement registration apparatus 150.

An advertisement setting unit 512 sets setting information for distributing the advertisement content (including a coupon or a point) provided by a shop developing a business in the specific region for the user (the communication apparatus 140) present in the specific region. For example, for registration of one advertisement content, the advertisement setting unit 512 includes information such as (1) designation of a specific region (for example, a radius of one kilometer from a specific point), (2) a target product name of an advertisement, and (3) an image or video data to be presented as the advertisement.

An advertisement condition setting unit 513 sets a condition for providing the advertisement content that has been set by the advertisement setting unit 512. For example, the advertisement condition setting unit 513 sets (i) identification information that has been given to the advertisement content, (ii) information indicating the rarity (for example, a numerical value 1 to 10) of the vehicle group to whom the advertisement content is displayed, and (iii) an attribute (gender, age, and the like) of the user to whom the advertisement content is displayed. In addition to or instead of the above conditions, an advertisement content of a specific type may be associated with a specific vehicle type. For example, an advertisement content related to general consumer goods can be associated with a vehicle type of a popular car, or an advertisement content related to goods for a family or goods for children can be associated with a family car. Further, an advertisement content of a luxury brand product can be associated with a vehicle type of a luxury car, or an advertisement content related to a sports product can be associated with a vehicle type of a sports car.

The information about the advertisement content and the advertisement condition are transmitted to the information processing server 110, and are stored in the storage unit of the information processing server 110.

<Series of Operations of Content Control Process in Information Processing Server>

Figure 6:
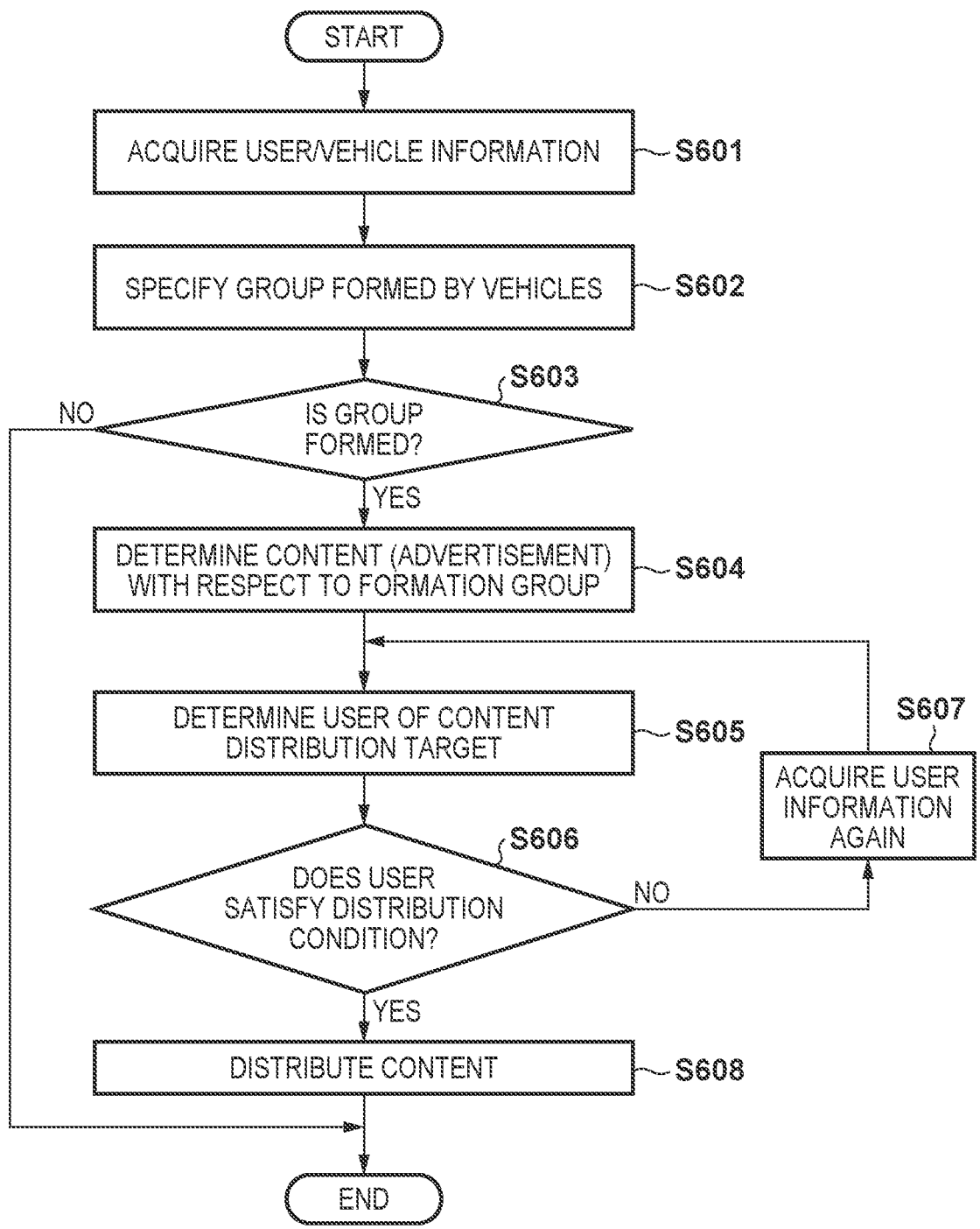
FIG. 6 is a flowchart illustrating a series of operations of a content control process in an information processing server according to the first embodiment.

Next, a series of operations of the content control process in the information processing server 110 will be described with reference to FIG. 6. Note that the present process is achieved by the CPU 210 of the controller 202 performing a program stored in the storage unit 203. Note that the advertisement content and the advertisement condition of the advertisement are set in the advertisement registration apparatus 150.

In S601, the information acquisition unit 212 of the controller 202 receives vehicle information from the vehicle 130, which is traveling in a predetermined region to be subject to the process. Further, the information acquisition unit 212 receives user information of the communication apparatus 140, which is present in the predetermined region to be subject to the process. In this situation, the information acquisition unit 212 acquires, from at least one vehicle, information regarding communication functions of a plurality of vehicles each having an inter-vehicle communication function. The information regarding the communication function includes information indicating which vehicle is capable of connecting with an inter-vehicle communication network on the inter-vehicle communication and which vehicle is conducting the inter-vehicle communication.

In S602, the vehicle group determination unit 213 of the controller 202 specifies a group including any of a plurality of vehicles traveling in the predetermined region to be subject to the process, based on vehicle information of the plurality of vehicles. Note that vehicles that form a group may be specified from among vehicles capable of connecting with the inter-vehicle communication network on the inter-vehicle communication or vehicles conducting the inter-vehicle communication.

For example, in a case where a plurality of vehicles are arranged in a predetermined pattern, for example, in a case where a predetermined number of vehicles are arranged in line within a predetermined distance, or in a case where a plurality of vehicles are located to form a field having a predetermined shape on a map, the vehicle group determination unit 213 specifies a group including the above vehicles. A group specifying process in the present step will be described later.

In S603, the controller 202 determines whether the vehicles have formed a group in S602. In a case where the controller 202 determines that the vehicles have formed the group, the process proceeds to S604, and in the other case, the present series of the processes end.

In S604, the content determination unit 214 of the controller 202 determines an advertisement content in accordance with the formation of the group of the vehicles that has been specified. In this situation, the content determination unit 214 changes the advertisement content to be distributed in accordance with the group formation that has been specified. For example, the content determination unit 214 determines the advertisement content that matches a group rarity level of the formed group of the vehicles specified in S603. In this situation, the content determination unit 214 may determine the advertisement content in further consideration of an attribute (gender, age, and the like) of the user in the advertisement condition.

In S605, the distribution destination user determination unit 215 of the controller 202 determines a user of a content distribution target. For example, the distribution destination user determination unit 215 determines the user of the communication apparatus 140 in connection with the access point of the vehicle that has formed the group or the communication apparatus 140, which is present in the vicinity of the communication apparatus 140, as the user of the content distribution target. Note that a plurality of users may be determined.

In S606, the distribution destination user determination unit 215 of the controller 202 determines whether the user determined in S605 satisfies a distribution condition. For example, in a case where the user is located on a sidewalk (the communication apparatus 140 is located on a sidewalk) based on the user information, the distribution destination user determination unit 215 determines that the user satisfies the distribution condition. In a case where the distribution destination user determination unit 215 determines that the user satisfies the distribution condition, the process proceeds to S608. In the other case, the process proceeds to S607. Note that in a case where some of the users determined in S606 satisfy the distribution condition, it may be determined that the users satisfy the distribution condition, and the process of next S608 may be performed on the above some users.

In S607, since it is determined that the user does not satisfy the distribution condition, the distribution destination user determination unit 215 acquires the user information again so as to be capable of tracking whether the user satisfies the distribution condition, and returns the process to S605 to determine a user of a distribution target again.

In S608, the content distribution unit 216 of the controller 202 distributes the advertisement content determined in S604 to the communication apparatus 140 of the user determined in S605. Then, the controller 202 ends the series of operations of the present process. Note that the content distribution unit 216 may distribute the advertisement content to the vehicle 130 so that the vehicle 130 distributes the advertisement content to the communication apparatus 140.

The communication apparatus 140 displays the advertisement content that has been received, by using, for example, an augmented reality (AR) technology. The AR technology according to the present embodiment is capable of presenting an advertisement content, by using, for example, location information that is acquirable from the GPS or the like of the sensor unit 304 of the communication apparatus 140 (that is, in a location-based manner). However, in addition to or instead of this method, the advertisement content may be presented by applying a technology of image recognition and space recognition to recognize and analyze an environment in front of the user directly (that is, in a vision-based manner). For example, in the present embodiment, the communication apparatus 140 displays using a location-based technology, but may combine the technology of image recognition and space recognition to further enhance display accuracy.

Further, for example, the communication apparatus 140 superimposes an image or moving image information of an advertisement content on a vehicle area (for example, an area of a door) of a captured image.

For example, in a case where while one vehicle stops, information about a shop of an advertised object (distributed in S608) is superimposed on a side face of such one vehicle, an image of which has been captured by holding the communication apparatus 140.

For example, in a case where three vehicles form a line in a longitudinal direction, numerical values representing slot reels may be superimposed on side face areas of the three vehicles, the image of which have been captured by holding the communication apparatus 140 over the three vehicles. In this situation, the superimposed number may be rotated, and when a predetermined number sequence ("777") is aligned, a coupon image may be further superimposed on the captured image.

Alternatively, guidance information indicating the address of the shop of the advertised object or the direction of the shop as viewed from the user may be superimposed on the side face of the vehicle, the image of which has been captured by holding the communication apparatus 140.

(Series of Operations of Group Specifying Process)

Furthermore, a series of operations of the group specifying process related to S604 in the content control process will be described.

Figure 8A:
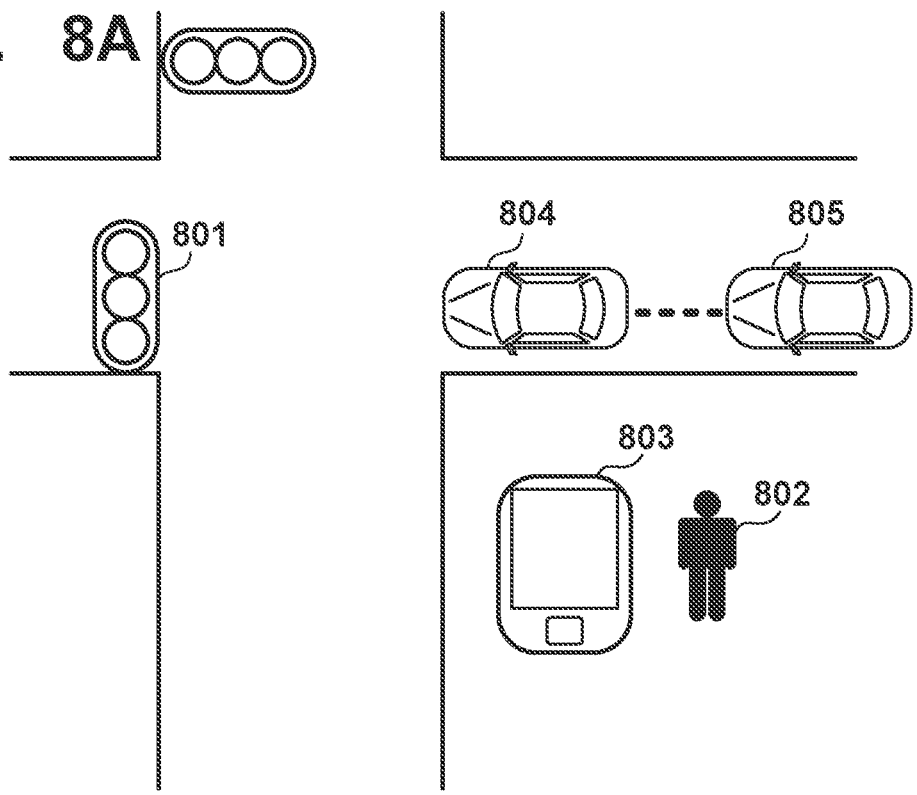
FIG. 8A is a first diagram illustrating an example of a group formation of vehicles according to the first embodiment.
Figure 8B:
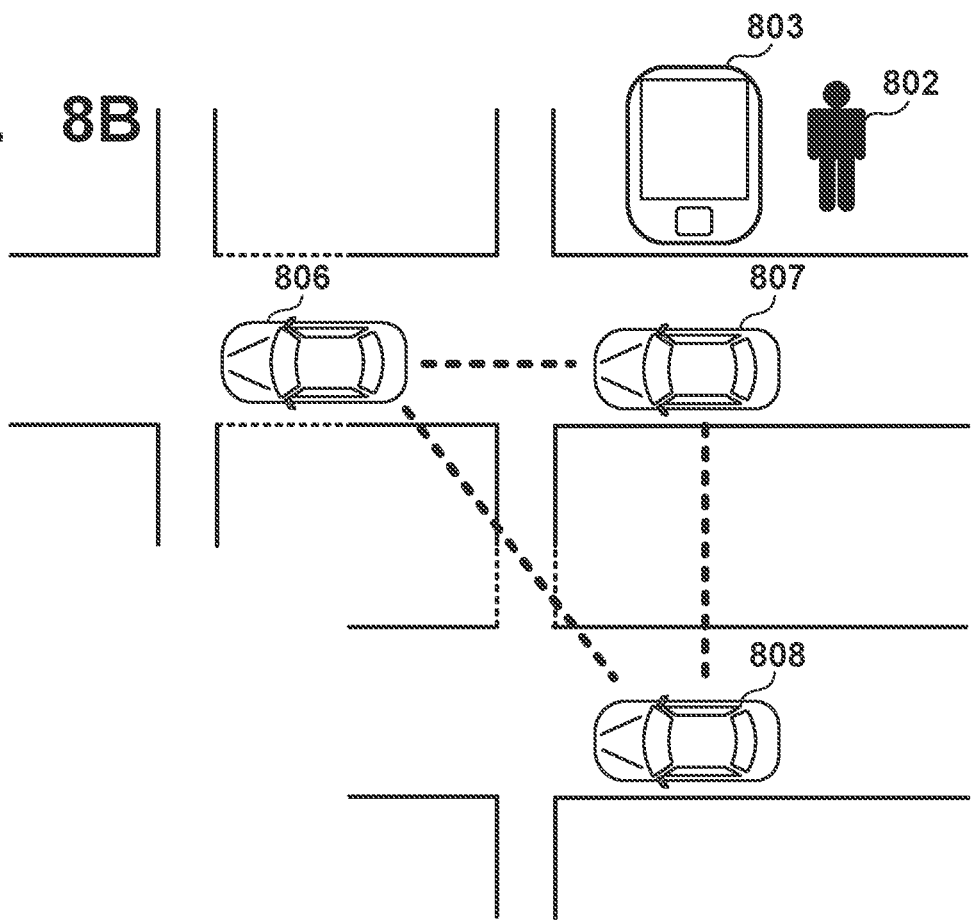
FIG. 8B is a second diagram illustrating an example of the group formation of the vehicles according to the first embodiment.

For example, a plurality of vehicles are arranged to form one group, in some cases. For example, as shown in FIG. 8A, at an intersection where a traffic light 801 is present, a user 803 having a communication apparatus 802 is located on a sidewalk. In this situation, the communication apparatus 802 is connected with an access point of a vehicle 804, which stops in the vicinity. In this situation, in a case where the vehicle 805 stops behind a vehicle 804, for example, the vehicle 804 and the vehicle 805 form one group, in some cases. Further, for example, as illustrated in FIG. 8B, at an intersection, the user 803 having the communication apparatus 802 is located on a sidewalk, and the communication apparatus 802 is connected with an access point of a vehicle 807, which stops in the vicinity. In this situation, for example, as illustrated in FIG. 8B, three vehicles 806 to 808 may form a triangular field.

The vehicle group determination unit 213 is capable of referring to group formation information that has been stored beforehand in the storage unit 204 in order to specify a group including vehicles. The group formation information is, for example, a table in which a formation pattern of vehicles that form a group is determined beforehand, as illustrated in FIG. 9.

The formation pattern of the vehicles includes, for example, a combination of the number of vehicles, the shape of a field formed with the vehicles, the vehicle types of the vehicles that form the group, and a time zone. The rarity level (for example, 1 to 10) of the group is associated, based on the rarity of these combinations. The rarity level of this group is associated with information indicating the rarity of the advertisement that has been registered by the advertisement registration apparatus 150 as described above.

The number of the vehicles that form the vehicle formation pattern and the shape of the field are respectively specified by each step of the group specifying process to be described below. For example, the vehicle group determination unit 213 specifies an attribute of a formation pattern for the vehicle 130, which is conducting the inter-vehicle communication from among the vehicles in a predetermined region to be subject to the process.

In S701, the vehicle group determination unit 213 specifies the number of vehicles that form the group. For example, the vehicle group determination unit 213 specifies that the number of vehicles is two in the example of FIG. 8A, and the number of vehicles is three in the example of FIG. 8B.

In S702, the vehicle group determination unit 213 specifies a field formed with the vehicles specified in S701. For example, in the example of FIG. 8A, a specific field is not identified because the vehicles are simply arranged in line, but in the example of FIG. 8B, the field shape of the vehicles is identified as a triangle.

In S703, the vehicle group determination unit 213 specifies the formation of the type of the vehicle, based on the vehicle information. In a case where the group is formed with only a specific vehicle type or a combination of specific vehicle types, the vehicle type (for example, a popular car, a family car, a luxury car, or a sports car is distinguished) is identified.

In S704, the vehicle group determination unit 213 specifies a time zone when the group is formed.

In S705, the vehicle group determination unit 213 compares the attributes specified in S701 to S704 with the formation patterns of the vehicle illustrated in FIG. 9 described above, and specifies a matched one as a formation group.

In this manner, as illustrated in FIG. 9, the formation of the group is distinguishable in accordance with the number of vehicles that belong to the group. In this situation, the group formation can be set such that, for example, as the number of vehicles that belong to the group increases, the rarity of the content to be distributed increases. In addition, as described above, the group formation is distinguishable in accordance with the shape of the field formed with the locations of the vehicles that belong to the group. Furthermore, the group formation may be distinguishable in accordance with the vehicle type. By distinguishing between the groups from the viewpoint of the moving object in this manner, the group including a plurality of nearby vehicles can have various variations. Further, the user who receives the content is able to intuitively understand the high or low of the rarity.

In this manner, the vehicle group determination unit 213 specifies a group from the vehicles that satisfy the formation pattern described in the group formation information from among the plurality of vehicles traveling in the predetermined region to be subject to the process. In this situation, in a case of being capable of specifying a plurality of vehicle groups, the vehicle group determination unit 213 specifies a group having a higher rarity level. In a case of being capable of specifying a plurality of groups having the same rarity level, the vehicle group determination unit 213 specifies a group having a larger area to be formed or a longer distance between the vehicles.

In a case where the vehicle included in the group is a vehicle conducting the inter-vehicle communication, the connection state on the inter-vehicle communication can change from moment to moment. Therefore, the field in the group formation is controlled so as to be maintained as a formation of the group for a predetermined period, even after the inter-vehicle communication that is connected between the vehicles that belong to the group is disconnected.

Subsequently, when the present step ends, the vehicle group determination unit 213 returns to the process of FIG. 6.

Note that the method for forming the group is not limited to the above example. For example, it is assumed that a predetermined rarity level (for example, 1) is assigned, in a case where a group is formed with two vehicles in a certain time zone. On the other hand, in another time zone, even in a case where a group similarly includes two vehicles, a different rarity level (for example, 2) may be assigned. Accordingly, different contents can be distributed in accordance with the time zone when the group is formed.

In addition, in the example illustrated in FIG. 9, whenever the number of vehicles increases by one, the rarity levels of different groups are assigned. However, the rarity level of a different group may be assigned for every predetermined number.

Furthermore, the group formation may be differentiated depending on the number of hops of the network formed with the vehicles connected with the network.

Further, in the above description, an example has been described in which the group formation is distinguished in accordance with the number of moving objects that belong to the group, and the rarity of the content increases, as the number of moving objects increases. However, the group formation may be distinguishable in accordance with the number of communication apparatuses connected with the moving object that belongs to the group via the network. Alternatively, the group formation may be distinguishable in consideration of the total of the number of moving objects that belong to the group and the number of communication apparatuses connected with the moving object that belongs to the group via the network. In this manner, the formation of various groups is enabled, and production of various types of unexpectedness is enabled.

Note that the above-described group formation has been described by giving the case where a target group is a group including vehicles. However, in a case where a drone or the like capable of controlling its altitude is included as a moving object, the shape formed with a group is not limited to a two-dimensional field shape, and may be a three-dimensional spatial shape.

Further, as described above, the contents in the above-described embodiment may be game contents. In this case, the advertisement registration apparatus may be any game content registration apparatus capable of registering the game contents. In the game content registration apparatus, setting information for distributing a game content and a condition for providing the game content can be set. The setting information for distributing the game content and the condition for providing the game content may be similar to those of the case of the advertisement content.

Further, in a case where (the communication apparatus of) a user is located in a field including a moving object, a character of a battle opponent may be distributed as a content to battle against a character of the user. In addition, a plurality of users in a field including a moving object may form a team. In this situation, in order to reduce a risk caused by playing the game while the user is walking, the character may be distributed while the movement of the user stops. In this manner, the enjoyment of the game can be increased by utilizing the randomness of the group including the moving objects.

Furthermore, when (the communication apparatus of) the user is located in a field including a moving object and checks in to a predetermined place (for example, a centroid point) in the field, another game content (for example, a game item or a point) may be provided. In this situation, the game item or the point to be provided may be changed in accordance with the shape of the field to be formed.

Heretofore, as described above, in the present embodiment, the information processing server 110 controls the distribution of the advertisement content so that the content is differentiated depending on the group including the vehicles. With such a configuration, the provision of a content of unexpectedness for the communication apparatus using the access point is enabled.

Second Embodiment

Hereinafter, a second embodiment according to the present invention will be described. In the first embodiment, the case where the content control process is performed by the information processing server 110 has been described as an example. In the second embodiment, the vehicle 130 acquires the user information and the vehicle information from the information processing server 110, and the vehicle 130 performs the content control process. In the description of the second embodiment, it is assumed that the same reference numerals exhibit the same or substantially the same function, and duplicated description will be omitted, and differences will be mainly described.

<Configuration of Information Processing Server>

Figure 2:
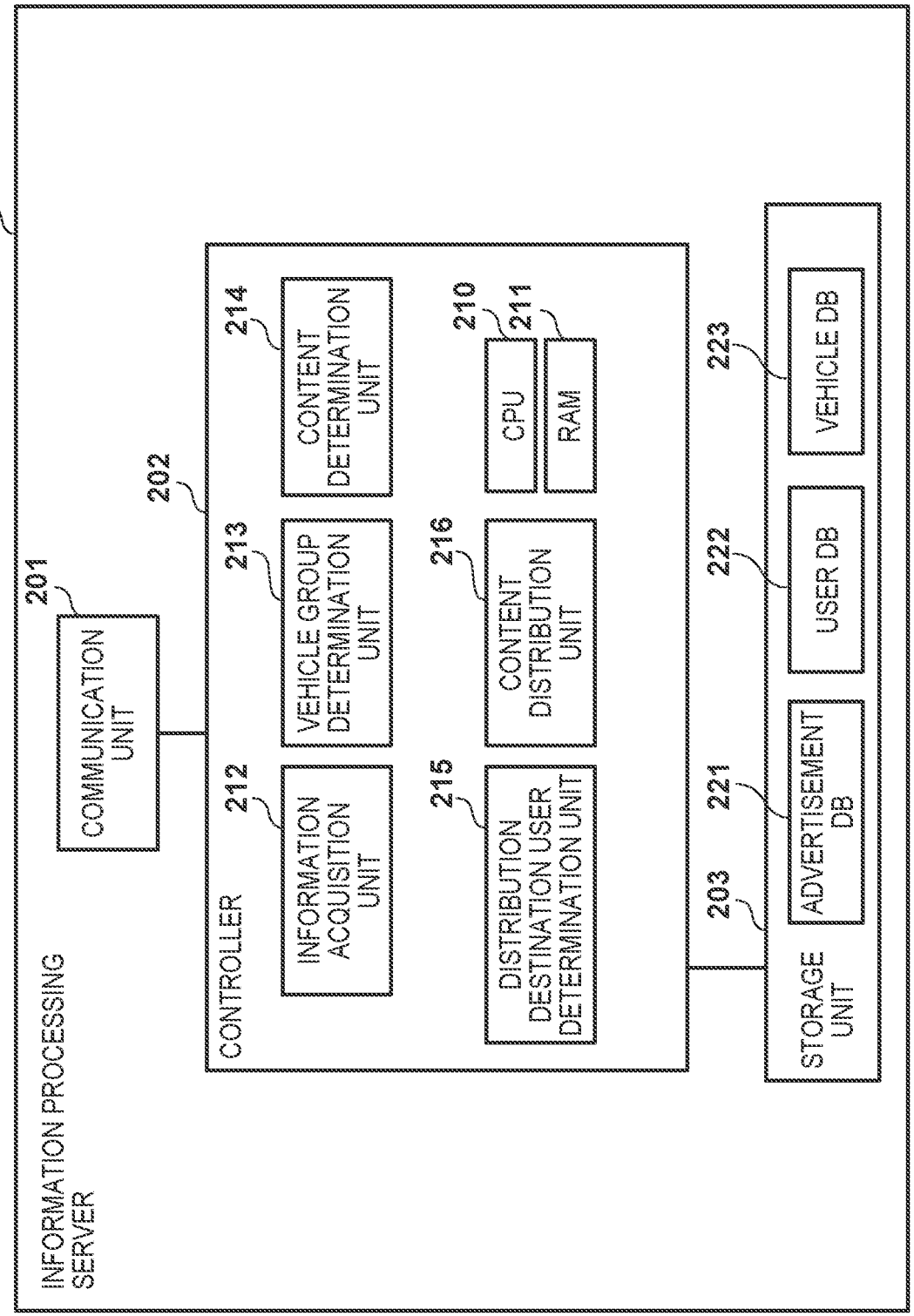
FIG. 2 is a block diagram illustrating a functional configuration example of an information processing server as an example of an information processing apparatus according to the first embodiment.

The configuration of the information processing server 110 may be substantially identical to the configuration illustrated in FIG. 2, but the information processing server 110 in the present embodiment may provide the vehicle 130 with a part of each of the user information, the vehicle information, and the advertisement information stored in the storage unit 204.

<Vehicle Configuration>

Figure 10:
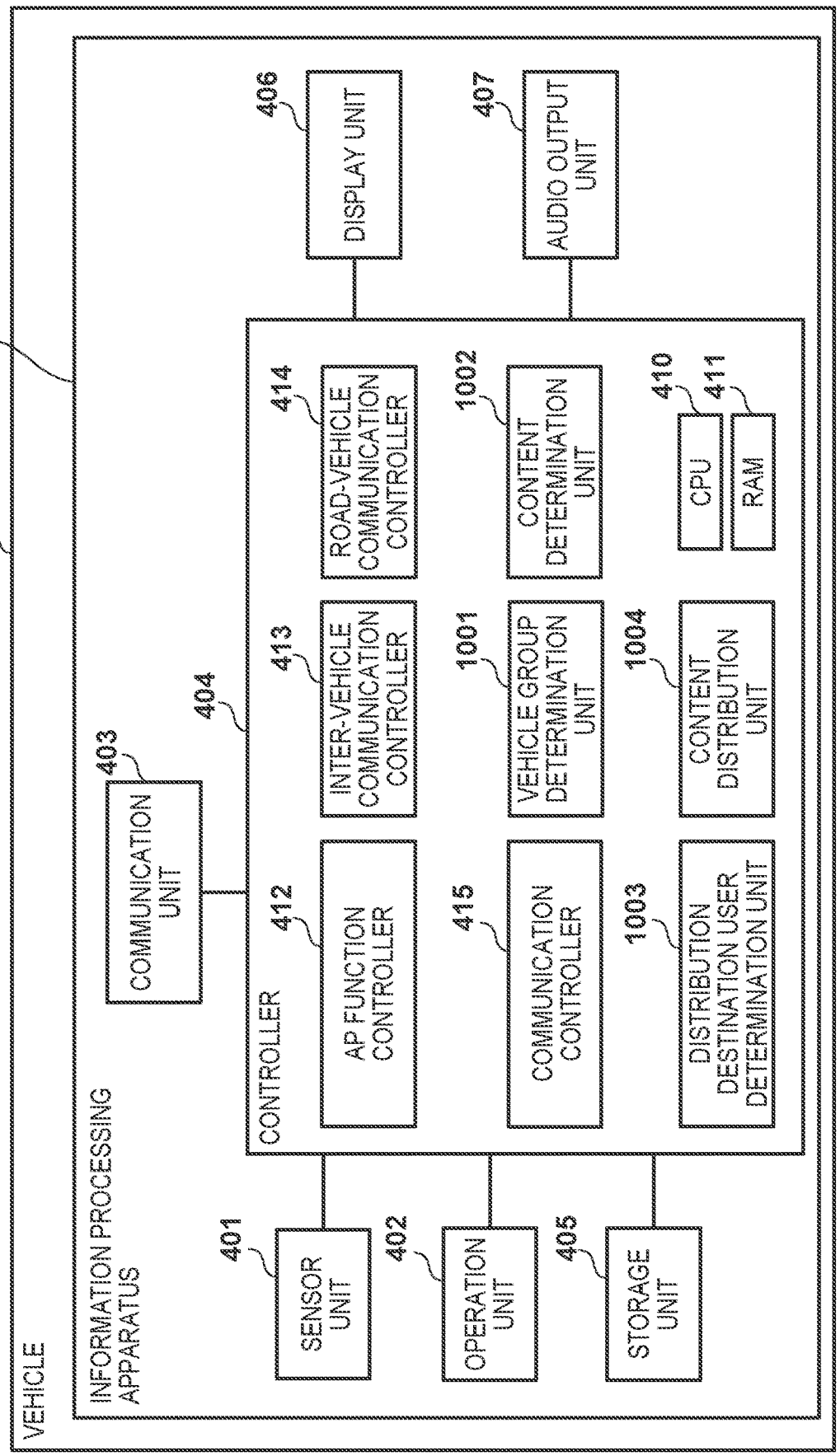
FIG. 10 is a block diagram illustrating a functional configuration example of an information processing apparatus in a vehicle according to a second embodiment.

A configuration of the vehicle 130 according to the present embodiment will be described with reference to FIG. 10. The vehicle according to the present embodiment includes an information processing apparatus 1000. The controller 404 includes a vehicle group determination unit 1001, a content determination unit 1002, a distribution destination user determination unit 1003, and a content distribution unit 1004, and such a configuration is different from that of the first embodiment. However, the other configurations are similar to those of the first embodiment.

The vehicle group determination unit 1001 specifies a group including the vehicles, based on the vehicle information of one or more vehicles 130, which are present in a specific region that has been acquired from the information processing server 110. Alternatively, the vehicle group determination unit 1001 may acquire the vehicle information on the inter-vehicle communication of the vehicle 130, and may specify the group including the vehicles. In addition, the vehicle group determination unit 1001 may acquire information indicating which vehicle is connectable with the inter-vehicle communication network on the inter-vehicle communication and which vehicle is conducting the inter-vehicle communication (that is, information regarding the communication function), and may specify the vehicles that form the group from among the vehicles connectable with the inter-vehicle communication network on the inter-vehicle communication or the vehicles conducting the inter-vehicle communication.

The content determination unit 1002 determines a content to be provided for the communication apparatus 140 to be connected with the vehicle 130, in accordance with the vehicle group that has been determined. The content is determined to be differentiated depending on what type of vehicle group is formed in the vicinity of the communication apparatus 140. For example, in a case where a vehicle group with a high rarity (rare) is formed, the content is determined to transmit an advertisement product or a coupon corresponding to the rarity. With such a configuration, the user of the communication apparatus 140 can receive the content that is not uniform and that has unexpectedness in accordance with the situation that occurs in the vicinity.

The distribution destination user determination unit 1003 determines the communication apparatus 140, to which the advertisement content is distributed. For example, among the users present in the vicinity of the vehicle 130, the distribution destination user is determined in accordance with the user information (a user's attribute) of the communication apparatus 140, a moving state (a user's moving state) of the communication apparatus 140, and the like.

The content distribution unit 1004 distributes the advertisement content that has been determined to the communication apparatus 140 of a distribution destination via, for example, the Wi-Fi communication provided by the communication unit 403.

<A Series of Operations Related to Content Control Process>

Next, a content control process in the vehicle will be described. The content control process in the vehicle is achieved by the CPU 410 of the controller 404 performing a program stored in the storage unit 405. Note that the subjects that perform the content control process and the content determination process described above are different. However, the process contents may be the same, and thus duplicated descriptions will be omitted.

That is, the respective operations in S602 to S608 that have been described above with reference to FIG. 6 are correspondingly performed by the vehicle group determination unit 1001, the content determination unit 1002, the distribution destination user determination unit 1003, and the content distribution unit 1004, in the controller 404.

Further, the content determination unit 1002 performs the content determination process related to S701 to S705 illustrated in FIG. 7.

As described above, in the present embodiment, the information processing apparatus 1000 of the vehicle 130 controls the distribution of the content so that the content is differentiated depending on the group including the vehicles. With such a configuration, the provision of a content of unexpectedness for the communication apparatus using the access point is enabled.

CONCLUSION OF EMBODIMENTS

1. A communication system (for example, 100) in the above-described embodiments includes:
   a first communication unit (for example, 403, 412) configured to conduct wireless communication with a communication apparatus present in a vicinity of a moving object;
   a second communication unit (for example, 403, 413) configured to conduct inter-vehicle wireless communication with a communication unit mounted on another moving object;
   a group specifying unit (for example, 213, 1001) configured to specify a group formed with a plurality of moving objects each including the second communication unit; and
   a distribution unit (for example, 216, 1004) configured to distribute a content to the communication apparatus,
   in which the distribution unit differentiates the content to be distributed to the communication apparatus depending on a formation of the group that has been specified by the group specifying unit (for example, S608).

According to this embodiment, a content of unexpectedness can be provided for the communication apparatus that uses an access point.

2. In the above-described embodiment,
   the formation of the group is distinguishable in accordance with at least one of the number of the moving objects that belong to the group, the number of the communication apparatuses connected with the moving object that belongs to the group via a network, or a total of the number of the moving objects that belong to the group and the number of the communication apparatuses connected with the moving object that belongs to the group via the network.

According to this embodiment, variations can be easily given to the group including a plurality of moving objects in the vicinity.

3. In the above-described embodiment,
the distribution unit differentiates the content to increase a rarity of the content to be distributed to the communication apparatus, as the number of the moving objects that belong to the group, the number of the communication apparatuses connected with the moving object that belongs to the group via the network, or the total of the number of the moving objects that belong to the group and the number of the communication apparatuses connected with the moving object that belongs to the group via the network increases.

According to this embodiment, a user who receives the content is able to intuitively understand the high or low of the rarity.

4. In the above-described embodiment,
the formation of the group is distinguishable in accordance with a shape of a field formed with locations of the moving objects that belong to the group.

According to this embodiment, a variation of the group based on the characteristics of the moving object that moves in a space extending on a plane can be given.

5. In the above-described embodiment,
the field in the formation of the group is maintained as the formation of the group for a predetermined period, even after the inter-vehicle communication connected between the moving objects that belong to the group is disconnected.

According to this embodiment, a connection state on the inter-vehicle communication that is changeable from moment to moment can be effectively handled for the predetermined period.

6. In the above-described embodiment,
the group specifying unit specifies a formation having a largest area among the shapes formed with the moving objects that belong to the group, as the field in the formation of the group.

According to this embodiment, in a case where a plurality of fields are simultaneously formed with the moving objects, a priority can be given in which field should be specified.

7. In the above-described embodiment,
the formation of the group is distinguishable in accordance with a type of the moving object, and
the distribution unit differentiates the content to be distributed to the communication apparatus in accordance with the formation of the group that is different depending on the type of the moving object.

According to this embodiment, a variation in content distribution in accordance with the appearance (similar to the appearance of the spots of a plurality of dice) depending on the type of the moving object can be given.

8. In the above-described embodiment,
the distribution unit is included in a moving object that provides the communication apparatus with an access point.

According to this embodiment, an increase in the number of users to whom the content can be distributed is enabled.

9. An information processing apparatus (for example, 110) in the above-described embodiments is an information processing apparatus (for example, 110) that distributes a content, the information processing apparatus including:

a first communication unit (for example, 412) configured to conduct wireless communication with a communication apparatus present in a vicinity of a moving object (for example, 130);
a second communication unit (for example, 413) configured to conduct inter-vehicle wireless communication with a communication unit mounted on another moving object;
an acquisition unit (for example, 212, S601) configured to acquire, from at least the moving object, information regarding a communication situation of a plurality of moving objects each including the second communication unit;
a group specifying unit (for example, 213) configured to specify a group formed with a plurality of moving objects each including the second communication unit; and
a distribution unit (for example, 216) configured to distribute a content to the moving object so that the moving object distributes the content to a communication apparatus, or configured to distribute the content to the communication apparatus,
in which the distribution unit differentiates the content to be distributed depending on a formation of the group that has been specified by the group specifying unit.

According to this embodiment, a content of unexpectedness can be provided for the communication apparatus that uses an access point.

The invention is not limited to the foregoing embodiments, and various variations/changes are possible within the spirit of the invention.

What is claimed is:

1. A communication system comprising:
one or more processors; and
a memory storing instructions which, when the instructions are executed by the one or more processors, cause the one or more processors to:
conduct wireless communication with a communication apparatus present in a vicinity of a moving object;
conduct inter-vehicle wireless communication with a communication device mounted on another moving object;
specify a group formed with a plurality of moving objects capable of conducting the inter-vehicle wireless communication;
identify a rarity of the group based on a formation of the group that has been specified; and
distribute a content to the communication apparatus,
wherein the distributing of the content includes differentiating the content to be distributed to the communication apparatus depending on the rarity of the group.

2. The communication system according to claim 1, wherein the formation of the group is distinguishable in accordance with at least one of the number of the moving objects that belong to the group, the number of the communication apparatuses connected with the moving object that belongs to the group via a network, or a total of the number of the moving objects that belong to the group and the number of the communication apparatuses connected with the moving object that belongs to the group via the network.

3. The communication system according to claim 2, wherein the distributing of the content includes differentiating the content to increase the rarity as the number of the moving objects that belong to the group, the number of the communication apparatuses connected with the moving object that belongs to the group via the network, or the total of the number of the moving objects that belong to the group and the number of the communication apparatuses connected with the moving object that belongs to the group via the network increases.

4. The communication system according to claim 2, wherein the formation of the group is distinguishable in accordance with a shape of a field formed with locations of the moving objects that belong to the group.

5. The communication system according to claim 4, wherein the field in the formation of the group is maintained as the formation of the group for a predetermined period, even after the inter-vehicle communication connected between the moving objects that belong to the group is disconnected.

6. The communication system according to claim 4, wherein the specifying the group includes specifying a formation having a largest area among a plurality of shapes formed with the moving objects that belong to the group, as the field in the formation of the group.

7. The communication system according to claim 1,
wherein the formation of the group is distinguishable in accordance with a type of the moving object, and
the distributing of the content includes differentiating the content to be distributed to the communication apparatus in accordance with the formation of the group that is different depending on the type of the moving object.

8. The communication system according to claim 1, wherein the moving object that provides the communication apparatus with an access point distributes the content to the communication apparatus.

9. An information processing method performed in an information processing apparatus configured to distribute a content, a moving object including communication circuits capable of conducting wireless communication with a communication apparatus present in a vicinity and inter-vehicle wireless communication with a communication device mounted on another moving object, the information processing method comprising:
  acquiring, from at least the moving object, information regarding a communication situation of a plurality of moving objects that conduct the inter-vehicle wireless communication; and
  specifying a group formed with the plurality of moving objects that conduct the inter-vehicle wireless communication;
  identify a rarity of the group based on a formation of the group that has been specified; and
  distributing of the content to the moving object so that the moving object distributes the content to the communication apparatus, or distributing of the content to the communication apparatus,
  wherein the distributing of the content includes differentiating the content to be distributed depending on the rarity of the group.

10. A control method for a moving object performed in the moving object, the moving object including communication circuits capable of conducting wireless communication with a communication apparatus present in a vicinity of the moving object and inter-vehicle wireless communication with a communication device mounted on another moving object, the control method comprising:
  specifying a group formed with a plurality of moving objects that conduct the inter-vehicle wireless communication;
  identify a rarity of the group based on a formation of the group that has been specified; and
  distributing a content to the communication apparatus,
  wherein the distributing of the content includes differentiating the content to be distributed to the communication apparatus depending on the rarity of the group.

* * * * *